Sept. 28, 1971   R. W. LUDWICK III, ET AL   3,608,198
THREE-DIMENSIONAL PROJECTOR AND VEIWER
Filed July 28, 1969   3 Sheets-Sheet 1

INVENTOR.
RUSSEL W. LUDWICK III
ROBERT E. LUDWICK
BY
Edward Dugas
ATTORNEY

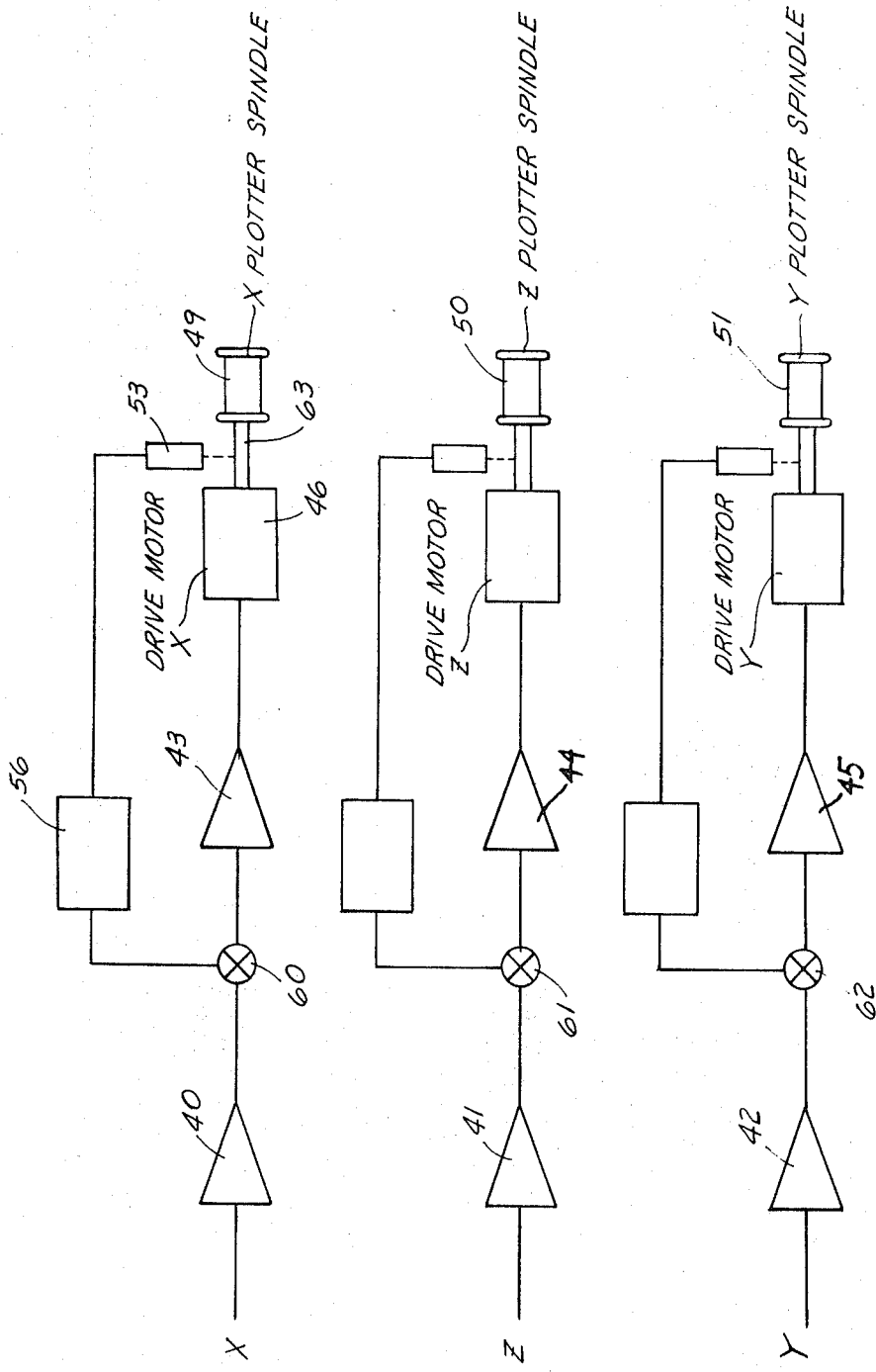

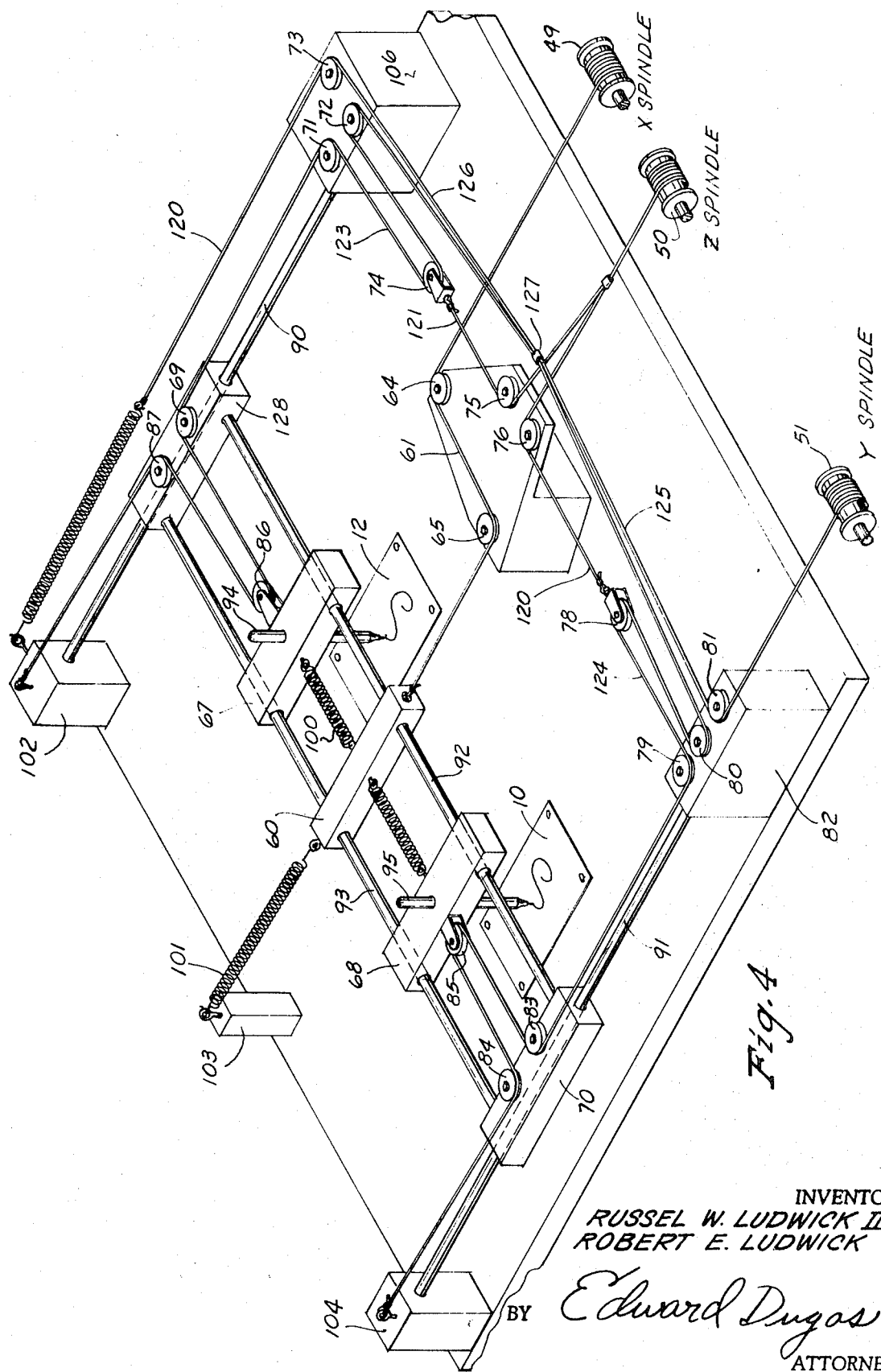

United States Patent Office  
3,608,198  
Patented Sept. 28, 1971

3,608,198  
THREE-DIMENSIONAL PROJECTOR AND VIEWER  
Russell W. Ludwick III and Robert E. Ludwick, both of 1401 Vista Del Mar, Fullerton, Calif. 92631  
Filed July 28, 1969, Ser. No. 845,255  
Int. Cl. B43l 13/00  
U.S. Cl. 33—1M                           3 Claims

ABSTRACT OF THE DISCLOSURE

The invention is directed to a system for directly producing images on two transparent viewing plates and for projecting the images to the eye of a viewer in a manner which causes a three dimensional effect. The images are produced by tracing the image to be projected with a light probe. Photocells mounted in the sides of a cube provide an electrical output which indicates the position of the probe in three dimensions. A double plotter transforms the signals into points or lines on a transparent recording medium. For re-creating the initial three dimensional image for viewing, the two substantially identical images are focussed onto a viewing lens by means of two parallel focussing lenses. Each focussing lens receive only one of the recorded images which it directs and superimposes on the viewing lens. The eyes of the viewer see the two superimposed images and combine them to form a composite image having depth.

BACKGROUND OF THE INVENTION

Various devices have been used to achieve a three-dimensional image. For example, a color television receiver using only the red and green color guns of the receiver have been used in combination with two vidion television cameras to produce two slightly displaced images on the face of the color receiver. The viewer wears glasses with one eyepiece filtering red and the other eyepiece filtering green. The two images thus received by the viewer's brain are combined into one composite picture which appears to have depth but which lacks true color. Using the aforementioned technique, full length motion pictures have been made and shown commercially.

Other well known devices are stereoscopic viewers which utilize two transparencies on which pictures are recorded. The viewer places his eyes against two separate eyepieces and each eye is allowed to see only one of the recorded pictures.

The stereoscopic type viewer achieves full color but must be viewed with the eyes closed to the viewer so as to limit the field of view of each eye to one image or channel. From the foregoing, it is obvious that each system has severe limitations and it would be highly desirable, therefore, to have a system which could be viewed in full color and which could be viewed from a distance by more than one person.

The transparencies used in a stereoscopic viewer are made by using two separated lens systems and exposing frames of film, one to each lens, each viewing the subject from a slightly different angle. In certain applications, such as three-dimensional drafting, it would be advantageous to be able to create the recorded images from a single source without the need for a special lens system. It would also be desirable to have projectors, television receivers, oscilloscopes, radar, and other viewing devices displaying their images in three dimensions. The present invention is directed to a system for making, projecting, and viewing three dimensional images which is adaptable either to still or moving images either in color or in black-and-white.

SUMMARY OF THE INVENTION

In the preferred system of the invention, produced stereoscopically related images are projected along parallel paths by means of mirrors to a set of individual focussing lenses. The images from each of the focussing lenses are then directed to and superimposed on a viewing lens. The eyes of the viewer combine the two images to form a composite image having depth. Apparatus is provided for producing the stereoscopically related images which comprises a light probe means that acts as a drawing instrument and at least three photosensitive elements positioned on X, Y, Z coordinate axes within a light-proof box (cube). Amplifiers are connected to each of the photosensitive elements to provide output signals indicative of the level of light radiation received by each of the elements.

The position of the light probe with respect to the photosensitive elements at any one point in time is uniquely defined by the three output signals from the amplifiers. The probe's position signals from the amplifiers are then applied to a plotting means appropriate servomechanism channels to cause the plotting means to draw two images, side by side, which are different only in the viewing angle of the photosensitive elements. The two drawn images may then be viewed through the optical system to duplicate the three-dimensional image traced by the drawing probe.

The images may also be made using known stereophotographic techniques. These images can also be viewed through this optical system without any modifications.

Accordingly, it is an object of the present invention to provide a system for creating and viewing three-dimensional images.

It is another object of the present invention to provide a basic optical system for viewing stereoscopic images.

It is another object of the present invention to provide a system for viewing three-dimensional information without the need for special glasses, filters, and the like.

It is another object of the present invention to provide a system wherein three-dimensional color viewing may be accomplished by two or more persons simultaneously.

These and other objects of the present invention will be better understood when taken in conjunction with the following description and drawings, throughout which like characters indicate like parts, and which drawings form a part of this application.

BRIEF DESCRIPTION OF THE DRAWINGS

FIG. 3 illustrates in block diagram form the servo-electronics for transforming the output of the photosensitive transducers into electrical position signals; and FIG. 4 illustrates a plotter for transforming the electrical position signals into stereoscopically related real images.

Referring to FIG. 1 wherein the basic optical system is shown; two stereoscopic related images 10 and 12 are projected onto mirrors 14 and 16 respectively by means of light sources 20. Mirrors 14 and 16 are positioned to reflect the images to mirrors 17 and 18 which, in turn, reflect the images to mirrors 20 and 19 respectively. Mirrors 20 and 19 then reflect the images to focussing lenses 21 and 22 which are spaced apart along a plane which is substantially perpendicular to the plane of the original images 10 and 12. A large mirror 24 is placed at a 45° angle with respect to the focussing axis of lenses 21 and 22 to reflect the focussed images 10 and 12 to converging lens 25. The viewer, looking at lens 25 sees the images 10 and 12 as a single, enlarged image having the appearance of depth. Images 10 and 12 are shown as stationary transparencies (positive) but each could be replaced with reels of film for the projection of three-dimensional motion pictures. Another desirable variation would be to replace the two still images with two television receiver picture tubes, each presenting one image of stereoscopically related images to provide a three-dimensional color television set. The lenses in the preferred embodiment have a 1:9 relationship, i.e., lens 25 is 9 times larger than lenses 21 or 22. For average viewing, the spacing of lenses 21 and 22 should be approximately 4″.

Referring now to FIG. 2, a hollow cube 30, having one open end, has mounted in three of its adjacent walls photocells 31, 32, and 33. The photocells thus define a three-axis coordinate system on which a point is uniquely defined.

Figure 1:
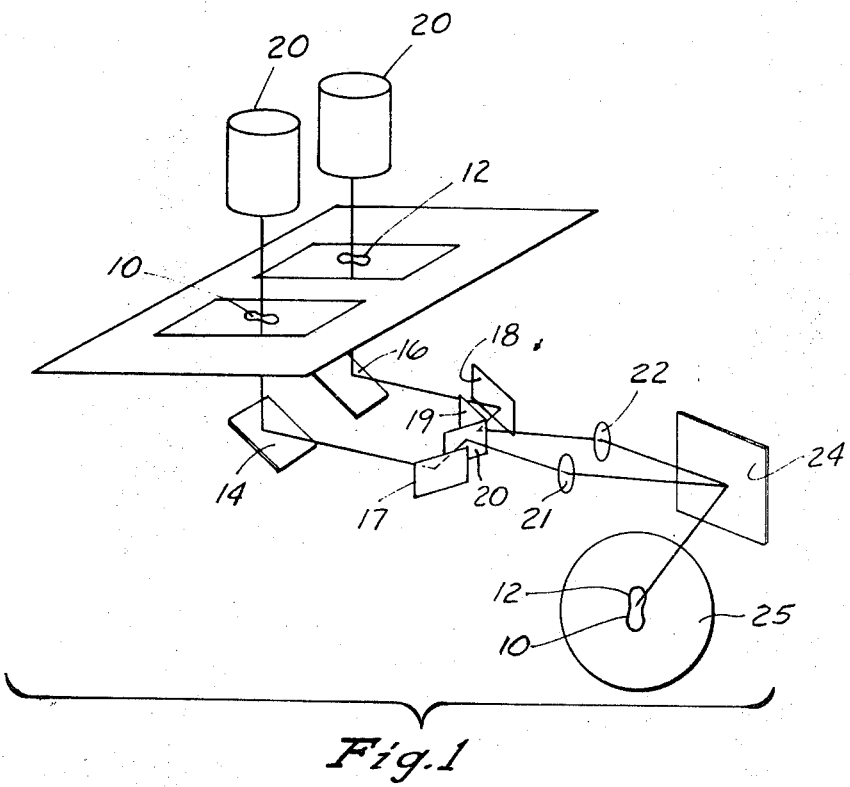
FIG. 1 illustrates in perspective view the basic optical system of the invention.
Figure 2:
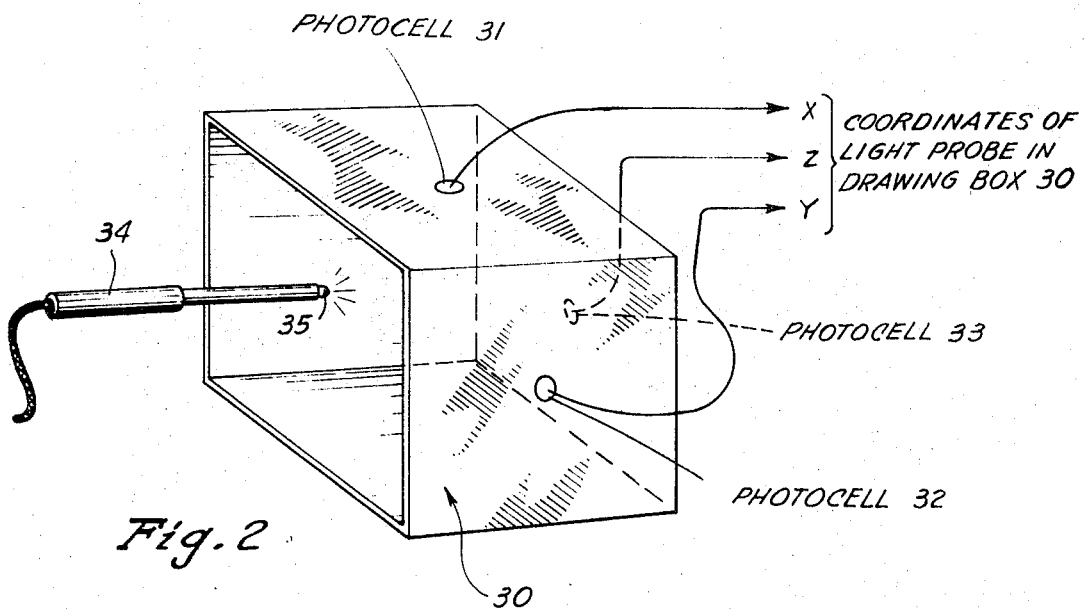
FIG. 2 illustrates in perspective view the light probe and photosensitive transducers.

A light probe 34 having a light source at its tip 35 is inserted into the cube structure to trace out a desired design. As the source 35 is moved closer to a photocell, the output level of the cell rises and as it is moved away, the output of the cell decreases. In this manner, the output from the three cells can provide three coordinate signals which are proportional to the position of the probe within the cube. Photocell 31 is placed along an imaginary X-axis. Photocell 32 is positioned along an imaginary Y-axis and photocell 33 is positioned along an imaginary Z-axis. The outputs from these photocells will therefore be designated X, Y, and Z respectively.

Referring now to FIG. 3, the X, Y, and Z signals from the photocells are applied to amplifiers 40, 42, and 41 respectively. The output of amplifiers 40, 41, and 42 are fed to summing points 60, 61, and 62 respectively and from there to the inputs of amplifiers 43, 44, and 45. The output of amplifier 43 is fed to a drive motor 46 having an output shaft 63. The output shaft 63 drives a spindle 49 and a feedback photometer 53 which provides a signal indicator of the angular positions of the shaft 63. The output from the photometer is fed to feedback circuit 56 which controls the gain and response characteristics of the servo loop such that the shaft position is a linear function of either the received X signal or the exact position of the light 35 with respect to the X axis in the drawing cube 30.

An identical arrangement is provided in the Y and Z channels to drive the Y-spindle 51 and the Z-spindle 50.

Referring now to FIG. 4 wherein the plotter is shown comprised of a framework having four end supports, 102, 104, 106, and 82. Between these supports extends tracks 90 and 91 which are parallel to each other and which for simplicity may be steel rods. Mounted on rods 90 and 91 are blocks 128 and 70 respectively. Tracks 92 and 93 are affixed between blocks 128 and 70 to provide a set of tracks which are perpendicular to the first formed tracks. A block 60 is firmly affixed to the tracks 92 and 93. Movable pen assemblies 67 and 68 are mounted on the tracks 92 and 93. A stationary block member 103 is connected to block 60 by means of a spring or rubber band 101. The pen assemblies are connected to each other by a spring or rubber band 100. Pulleys 86 and 85 are connected to pen assemblies 67 and 68 respectively. Pulleys 87 and 69 are fixedly attached to the movable block 128. Pulleys 84 and 83 are fixedly mounted to the movable block 70.

The X-spindle 49 drives the block 60 by means of winding or unwinding a line 61 which is guided by pulleys 64 and 65 to block 70. The Z-spindle 50 is connected by lines 120 and 121 to floating blocks 78 and 74 respectively through fixed pulleys 75 and 76. Line 123 runs through block 74, pulleys 71, 69, 86, and 87 and is connected at one end to the stationary point 102. Line 124 runs through floating block 78, pulleys 79, 83, 85, 84 with its end connected to the stationary point 104. The other end of line 123 goes through pulley 72 to point 127 and the other end of line 124 goes through pulley 80 to point 127. At point 127, line 123 is affixed to line 124 and also to line 126 and line 125. Line 126 extends to pulley 73 and is connected to a spring or rubber band 130 which in turn is affixed to a stationary block 105. The Y-spindle 51 is attached to line 125 which is guided to the spindle by fixed pulley 81. In response to the action of the spindles, the pen assemblies 67 and 68 will trace out images 10 and 12 on, for example, tracing paper. The images will be stereoscopically related to each other and when viewed through the basic optical system will appear in three dimension.

While there has been shown what is considered to be the preferred embodiment of the present invention, it will be manifest that many changes and modifications may be made therein without departing from the essential spirit of the invention. It is intended, therefore, in the annexed claims, to cover all such changes and modifications as may fall within the true scope of the invention.

In the claims:

1. Apparatus for forming stereoptical images comprising in combination:
   (a) at least three photoelectric cells positioned equally along three mutually perpendicular axes;
   (b) a light probe for tracing an image to be stereoptically formed by activating said photoelectric cells as a function of the position of said probe with respect to said axes; and
   (c) plotting means connected to the outputs of said photoelectric cells for transforming said outputs into two related images.

2. The invention according to claim 1 wherein said plotting means is comprised of:
   (a) two pen assemblies supported for movement in a plane;
   (b) servomechanism means responsive to the output of said photoelectric cells for moving said pen assemblies as a function of the output of said photoelectric cells; and
   (c) recording means for recording the trace of said pen assemblies.

3. The invention according to claim 2 wherein said servomechanism means is comprised of at least three closed loop channels, each having an input and an output, the input of each channel connected to a respective photoelectric cell output; and
   means responsive to the outputs of said channels for changing the spacing between said pen assemblies and the position of said pen assemblies in said plane as a function of the output of said photoelectric cells.

References Cited

UNITED STATES PATENTS

| | | | |
|---|---|---|---|
| 2,171,894 | 9/1939 | Rule | 33—20(A) |
| 2,936,207 | 5/1960 | Beaumont et al. | 346—3(D) |
| 3,068,575 | 12/1962 | Fenske et al. | 33—20(D) |
| 3,110,815 | 11/1963 | Sturm | 250—220(M) |

HARRY N. HAROIAN, Primary Examiner

U.S. Cl. X.R.

33—18